US008806557B2

(12) United States Patent
Francalanci et al.

(10) Patent No.: US 8,806,557 B2
(45) Date of Patent: Aug. 12, 2014

(54) METHOD OF ADJUSTING TIMING TRANSMISSION PARAMETERS IN A SINGLE FREQUENCY NETWORK

(75) Inventors: Indro Francalanci, Turin (IT); Daniele Franceschini, Turin (IT); Paola Bertotto, Turin (IT)

(73) Assignee: Telecom Italia S.p.A., Milan (IT)

( * ) Notice: Subject to any disclaimer, the term of this patent is extended or adjusted under 35 U.S.C. 154(b) by 982 days.

(21) Appl. No.: 12/448,521

(22) PCT Filed: Dec. 27, 2006

(86) PCT No.: PCT/EP2006/012531

§ 371 (c)(1), (2), (4) Date: Oct. 27, 2009

(87) PCT Pub. No.: WO2008/077431

PCT Pub. Date: Jul. 3, 2008

(65) Prior Publication Data

US 2010/0037279 A1 Feb. 11, 2010

(51) Int. Cl.
*H04N 7/173* (2011.01)
*H04K 1/10* (2006.01)
*H04L 27/28* (2006.01)

(52) U.S. Cl.
USPC .......... 725/118; 375/260

(58) Field of Classification Search
USPC .......... 725/114-120
See application file for complete search history.

(56) References Cited

U.S. PATENT DOCUMENTS 6,580,701 B1 * 6/2003 Ylitalo et al. .......... 370/334
2005/0163265 A1 * 7/2005 Gupta .......... 375/343
2006/0143677 A1 * 6/2006 Weiss .......... 725/117
2008/0040763 A1 * 2/2008 Geile et al. .......... 725/118
2009/0190675 A1 * 7/2009 Ling et al. .......... 375/260
2010/0128806 A1 * 5/2010 Francalanci et al. .......... 375/260
2011/0142148 A1 * 6/2011 Nakamura .......... 375/260

OTHER PUBLICATIONS

Agnes Ligeti and Jens Zander, IEEE Trannsaction on Broadcasting, vol. 45, No. 1, Mar. 1999, Title "Minimum Cost Coverage Planning for Single Frequency Networks".*

Brugger, R. et al., "OFDM Receivers—Impact on Coverage of Inter-Symbol Interference and FFT Window Positioning," EBU Technical Review, pp. 1-12, (Jul. 2003).

Ligeti, A. et al., "Minimal Cost Coverage Planning for Single Frequency Networks," IEEE Transactions on Broadcasting, vol. 45, No. 1, pp. 78-87, XP011006103, (Mar. 1999).

Loung, D., "Single Frequency Networks for DTV Part I," RF Technology, TV Technology.com, pp. 1-3, XP002449205, (May 2, 2003).

* cited by examiner

*Primary Examiner* — Nasser Goodarzi
*Assistant Examiner* — Fred Peng
(74) *Attorney, Agent, or Firm* — Finnegan, Henderson, Farabow, Garrett & Dunner, L.L.P.

(57) ABSTRACT

A method of adjusting the transmission station parameters in a digital video broadcasting network, includes determining, in at least one area element of a geographic area of interest, delays among signals received from a plurality of transmission stations; calculating, based on the determined delays, transmission delays to be applied to the transmission stations of the plurality, wherein the calculated transmission delays are adapted to reduce the delays among the received signals; and applying the calculated transmission delays to the transmission stations of the plurality. The choice of the timing parameters is based on a repetition of a random perturbation of a control parameter and the consequent evaluation of the result of the result obtained.

19 Claims, 8 Drawing Sheets

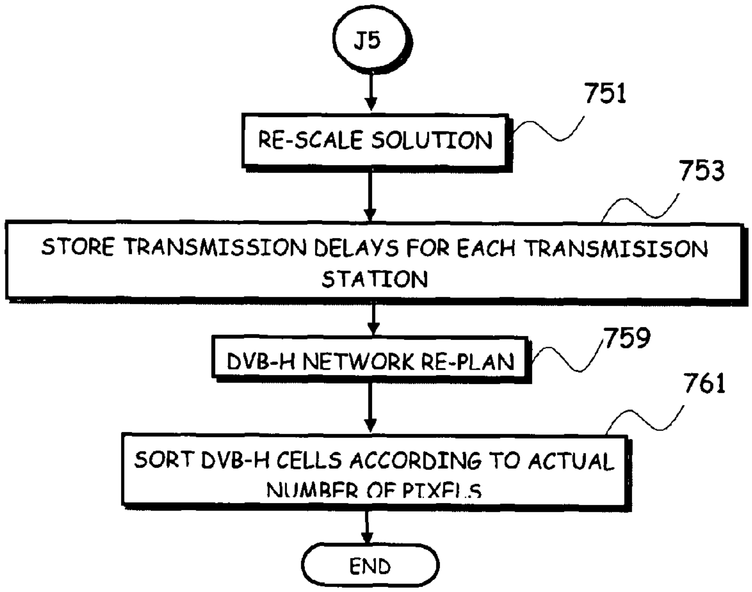
FIG. 7D
FIG. 7B
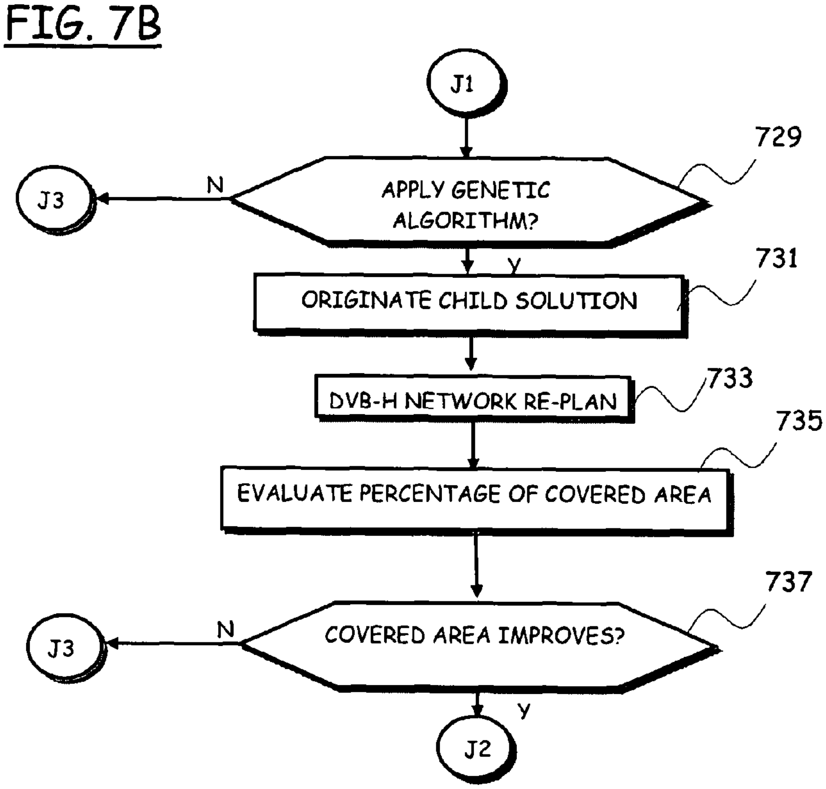

METHOD OF ADJUSTING TIMING TRANSMISSION PARAMETERS IN A SINGLE FREQUENCY NETWORK

CROSS REFERENCE TO RELATED APPLICATION

This application is a national phase application based on PCT/EP2006/012531, filed Dec. 27, 2006, the content of which is incorporated herein by reference.

FIELD OF THE INVENTION

The present invention generally relates to OFDM (Orthogonal Frequency Division Multiplex) telecommunications systems and methods, particularly to DVB (Digital Video Broadcasting) networks, and even more particularly to DVB-H (DVB-Handheld) networks. Specifically, the present invention concerns a method of adjusting transmission parameters in a DVB-H network, e.g. during a DVB-H network planning phase.

BACKGROUND OF THE INVENTION

DVB represents the technological evolution that is going to replace the analog TeleVision (TV) broadcasting systems used for more than 50 years.

In particular, due to the enormous popularity gained by personal mobile communications, a promising evolution of DVB is the DVB-H (DVB-Handheld) system, by means of which TV will be made available to users of mobile communications terminals like mobile phones.

As known to those skilled in the art, the DVB-H system is an SFN (Single-Frequency Network) system based on OFDM (Orthogonal Frequency Division Multiplex). In an SFN, all transmitters in the network use the same channel/frequency. The OFDM is a modulation system in which the information is carried via a large number of individual (sub-) carriers, in a frequency multiplex scheme; each (sub-)carrier transports only a relatively small amount of information, and high data capacities are achieved using a large number of frequency-multiplexed carriers. Each carrier is modulated using QPSK (Quadrature Phase Shift Keying) and QAM (Quadrature Amplitude Modulation) techniques, and has a fixed phase and amplitude for a certain time interval, referred to as the "symbol time", during which a small portion of the information, called "symbol", is carried. After that time period, the modulation is changed and the next symbol carries the next information portion. The symbol time is the inverse of the (sub-)carrier spacing, and this ensures orthogonality between the carriers.

Modulation and demodulation are accomplished using the IFFT (Inverse Fast Fourier Transform) and the FFT, respectively.

In order to demodulate the received signal, the generic receiver has to evaluate the symbol during the symbol time. This involves properly positioning an FFT evaluation time window, i.e., properly "synchronize" the time window for the OFDM demodulation of the received signals.

The paper of R. Brugger and D. Hemingway, "OFDM receivers—impact on coverage of inter-symbol interference and FFT window positioning", EBU Technical Review, July 2003, pages 1-12, offers a general overview of the possible strategies for FFT window synchronization in OFDM receivers. These strategies are equally applicable to the T-DAB (Terrestrial-Digital Audio Broadcasting) and DBV-T (Digital Video Broadcasting-Terrestrial) systems.

In such systems, signals generally arrive at a generic receiver following different paths, corresponding to multiple transmitters and/or echoes of a same transmitted signal, to which there are associated different time delays; these different delays can cause ISI (Inter-Symbol Interference) at the receiver, because it is typically not possible to synchronize the FFT window to all the received signals: whichever the FFT window time positioning, there will always be some overlap with a preceding or following symbol in the transmission sequence. This ISI degrades the receiver's performance.

In order to allow, as much as possible, a constructive combination of the signals getting to the receiver through different paths, OFDM systems with multipath capabilities have been proposed, in which a "guard time interval" (sometimes also referred to as "guard space") is provided for. The guard time interval consists in a cyclic prolongation of the useful symbol time of the signal; essentially, the normal symbol duration is extended, so that a complete symbol comprises, in addition to a useful part, a cyclic prolongation of every symbol, whose time duration corresponds to the guard interval. In the cited paper of R. Brugger and D. Hemingway, the prolongation is obtained by copying part of the symbol from the beginning of the symbol to the end, increasing the duration of the guard interval.

Thanks to the provision of the guard interval, the OFDM receiver can position in time the FFT window so that there is no overlap with a preceding or subsequent symbol, thus reducing to a minimum the ISI.

Before the actual deployment of the network in a geographic area of interest, a network planning is performed, exploiting specifically-designed software tools.

In the network planning phase, the geographic area of interest is usually subdivided into several relatively small elementary area elements, also referred to as pixels, for example squares of 50 m by 50 m. Based on an initial network configuration, with a certain positioning and radio equipment of the DVB-H transmission stations, the distribution of the electromagnetic field in every pixel is estimated, by means of an electro-magnetic field propagation simulator. The generic pixel is assumed to represent a virtual DVB-H receiver, i.e. it is assumed that, in the generic pixel, at least one DVB-H receiver is located. For each pixel, the signal-to-noise ratio (also referred to as the "C/I", where C denotes the "useful" signal, and I denotes the interference) is estimated, to assess whether the network coverage in the considered pixel is adequate, or rather the network configuration should be modified to improve the network coverage.

In order to improve the reception quality, the received useful signal should be maximized, and the interference should be kept low; to this end, the network should be planned in such a way as to ensure that, in each pixel of the area of interest, most of the signals coming from different transmitters get to the considered pixel delayed from each other of less than the guard time interval. If this occurs, the received signal is not, or only scarcely, degraded by the ISI.

SUMMARY OF THE INVENTION

The Applicant has tackled the problem of providing a technique for planning a digital video broadcasting network, which is particularly suitable for broadcasting video signals in both outdoor and indoor environments.

The Applicant has observed that, although DVB-H networks seem to be the most suitable for the above purpose, the criteria adopted in the DVB network planning should take into account the peculiarities of DVB-H networks.

In fact, since DVB-H is devoted to broadcasting TV to mobile terminals like mobile phones, a DVB-H network is almost always characterized by the presence of transmission stations that are very different in nature: several low-height and relatively low-power transmission stations, of limited radio coverage range (of the order of few kilometers), essentially corresponding to the transceiver stations of a mobile telephony network, and few "elevated" and high-power, dominant transmission stations, corresponding to the usual broadcasting TV antennas, having a much wider radio range (of the order of 100 Km).

In such a scenario, a generic DVB-H receiver (e.g., a DVB-H mobile phone) may receive several relatively feeble signals of relatively low strength, originating and irradiated from the low-height transmission stations, and one, or few, relatively stronger signals, originating and irradiated from the dominant transmission station(s). In general, even if the signal irradiated by the dominant transmission site is not the most powerful signal received by a DVB-H receiver, it has a non-negligible power. The signals coming from the low-height transmission stations are generally rather close to each other, in terms of time delay, because they come from transmission stations that are spatially near to each other; on the contrary, the signal(s) coming from the dominant transmission station(s), which is(are) most of times far away from the receiver more than the low-height transmission stations, are affected by significant time delays, of more than 250 μs (which is a typical value for the guard time). In addition, echoes of these signals may be received as well, especially in indoor environments, due to reflection on building sides.

This problem is typical of DVB-H networks: in a DVB-T network, for example, where single areas of interest are covered by a single broadcast signal irradiated by an elevated transmission station, each receiver will typically receive one strong signal, and possible echoes thereof, and it is very unlikely that the strong signal follows the other signals with a substantial delay.

The Applicant has found that, in order to keep the interference low, transmission delays can deliberately be introduced in the low-height transmission stations, based on the propagation time of the signals coming from an elevated transmission station, so that the signals getting to the DVB-H receiver from the low-height transmission stations are kept as much as possible synchronized with the signal coming from the elevated transmission station, and the interference is thus reduced. In particular, these transmission delays can be determined in the network planning phase.

In a first aspect thereof, the present invention thus relates to a method of adjusting transmission station parameters in a digital video broadcasting network, comprising:

in at least one area element of a geographic area of interest, determining delays among signals received from a plurality of transmission stations; and based on said determined delays, calculating transmission delays to be applied to the transmission stations of said plurality, wherein said calculated transmission delays are adapted to reduce said signal delays.

Preferably, the method further comprises applying said calculated transmission delays to the transmission stations of said plurality.

Preferably, the calculated transmission delays form a first set of transmission delays, and the method further comprises:

varying a number of times one parameter affecting the signals delays, thus varying a corresponding number of times said signals delays; and repeating a corresponding number of times, based on the varied delays, the step of calculating the transmission delays to be applied to the transmission stations of said plurality to form a corresponding number of sets of transmission delays, wherein the transmission delays of each set is adapted to reduce said signals delays.

The method may further comprise randomly combining said first set and said number of sets to obtain a further set of transmission delays to be applied to the transmission stations of said plurality.

The method may further comprise selecting one among said first set and said number of sets based on the number of area elements that perceive a global signal quality over a predetermined threshold, wherein the global signal is the sum of the signals received in said at least one area element.

Preferably, varying a number of times one parameter comprises randomly varying a number of times said parameter so as to randomly varying a corresponding number of times said signals delays.

Said parameter may be one among the transmission power, antenna pattern, antenna tilt, antenna azimuth, antenna height, antenna position and said signals delay.

Randomly varying a number of times said signals delays may comprise:

defining a minimum value of said parameter, corresponding to a smaller perturbation of the signals delays;

defining a maximum perturbation parameter value, corresponding to a higher perturbation of the signals delays;

progressively decreasing the value said parameter from the maximum to the minimum value; and randomly selecting the signals delays from a range of random selection of values corresponding to the value assigned to the parameter.

Calculating the transmission delays may comprise:

a) determining a rank of the transmission stations of said plurality;

b) assigning to a first transmission station in the rank a reference transmission delay;

c) calculating the transmission delay to be assigned to the subsequent transmission station in the rank with respect to the reference transmission delay, so as to reduce in the highest number of area elements of the geographic area of interest the delays between the signals received from the first transmission station and the subsequent transmission station; and d) repeating step c) for the remaining transmission stations in the rank.

The rank may be based on the area coverage of the transmission stations, the first transmission station in the rank being the transmission station of said plurality having the greatest area coverage.

Repeating step c) for the remaining transmission stations may comprise, for each remaining transmission station, calculating the delay to be assigned to said remaining transmission station with respect to the reference transmission delay, so as to reduce in the highest number of area elements of the geographic area of interest the delays among the signals received from said remaining transmission station and from all the transmission stations preceding said remaining transmission station in the rank.

The method may further comprise:

modifying at least one time the rank of the transmission stations; and repeating steps b) to d) using the modified rank, determining each time the transmission delays.

Moreover, modifying the rank may include modifying the area coverage of the transmission stations.

Modifying the area coverage may comprise randomly modifying the area coverage.

Randomly modifying the area coverage may include:

defining a perturbation parameter;

defining a minimum perturbation parameter value, corresponding to a smaller perturbation of the area coverage;

defining a maximum perturbation parameter value, corresponding to a higher perturbation of the area coverage;

at each repetition of steps b) to d), assigning to the perturbation parameter a value progressively decreasing from the maximum to the minimum value; and randomly selecting the area coverage from a range of random selection of values corresponding to the value assigned to the perturbation parameter.

The method may further comprise:

randomly combining transmission delays values determined at different repetitions of the steps b) to d) to obtain new transmission delays values.

The present invention also relates to a digital broadcasting network, in particular a DVB-H network, configured to perform the above method.

The present invention also relates to a computer program comprising instructions adapted to implement the above method.

Moreover, the present invention relates to a data processing system adapted to implement the method according to any one of the preceding claims when programmed to executed the above computer program.

BRIEF DESCRIPTION OF THE DRAWINGS

The features and advantages of the present invention will result apparent by reading the following detailed description of an embodiment thereof, provided merely by way of non-limitative example, and referring to the annexed drawings, wherein:

FIGS. 7A, 7B and 7C and 7D show a schematic flowchart of a method for calculating transmission delays to be assigned to DVB-H transmission stations for reducing the interference experienced in the elementary area elements of the area of interest, according to an embodiment of the present invention.

DETAILED DESCRIPTION OF THE PREFERRED EMBODIMENT OF THE INVENTION

Figure 1:
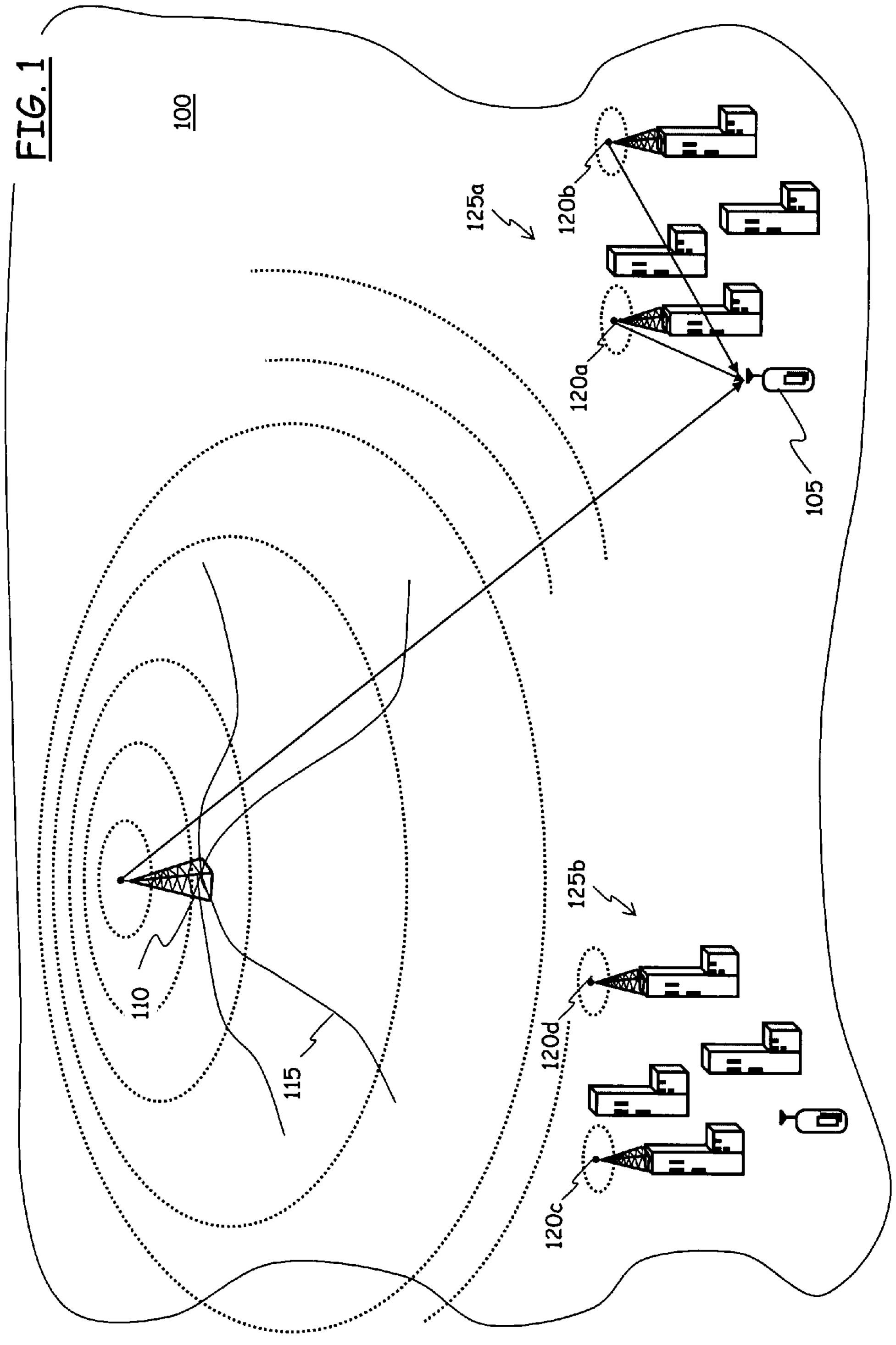
FIG. 1 pictorially shows a portion of a geographic area covered by a DVB-H network, with elevated, wide-range transmission stations and low-height, reduced radio range transmission stations.

Making reference to FIG. 1, there is schematically shown a portion of a geographic area 100 covered by a DVB-H network, for broadcasting TV to DVB-H mobile terminals, like mobile phones 105; the geographic area 100 is assumed to be an area under planning of the DVB-H network.

The scenario depicted in FIG. 1, rather typical for DVB-H networks, is characterized by the presence of transmission stations that are very different in nature: several "low-height" transmission stations, of reduced radio range (of the order of few Kilometers), located for example in correspondence of the transceiver stations (BTSs—Base Transceiver Stations—of a GSM network, Node Bs of a UMTS network) of a mobile telephony network, and few "elevated", dominant transmission stations, corresponding to the usual broadcasting TV antennas, having a much wider radio range (of the order of 100 Km). In particular, looking at FIG. 1, just one elevated transmission station 110 is shown, for the sake of simplicity, depicted as located on top of a hill or mountain 115, working in conjunction with four low-height transmission stations 120*a*, 120*b*, 120*c* and 120*d*, the first two being distributed in a first urban area 125*a* (e.g. a town, or a village), the second two being distributed in a second urban area 125*b*.

Considering a hypothetic DVB-H terminal (a DVB-H receiver) 105, for example a DVB-H mobile phone, located for example in the first urban area 125*a*, this DVB-H receiver 105 will receive the relatively low-strength radio signals irradiated by the low-height transmission stations 120*a*, 120*b* distributed across the urban area 125*a* (particularly, it will receive the radio signals irradiated by those, among the transmission stations 120*a*, 120*b*, that are located in the neighborhoods of the DVB-H terminal 105), and the relatively strong signal irradiated by the elevated site 110, together with the respective echoes.

Figure 2:
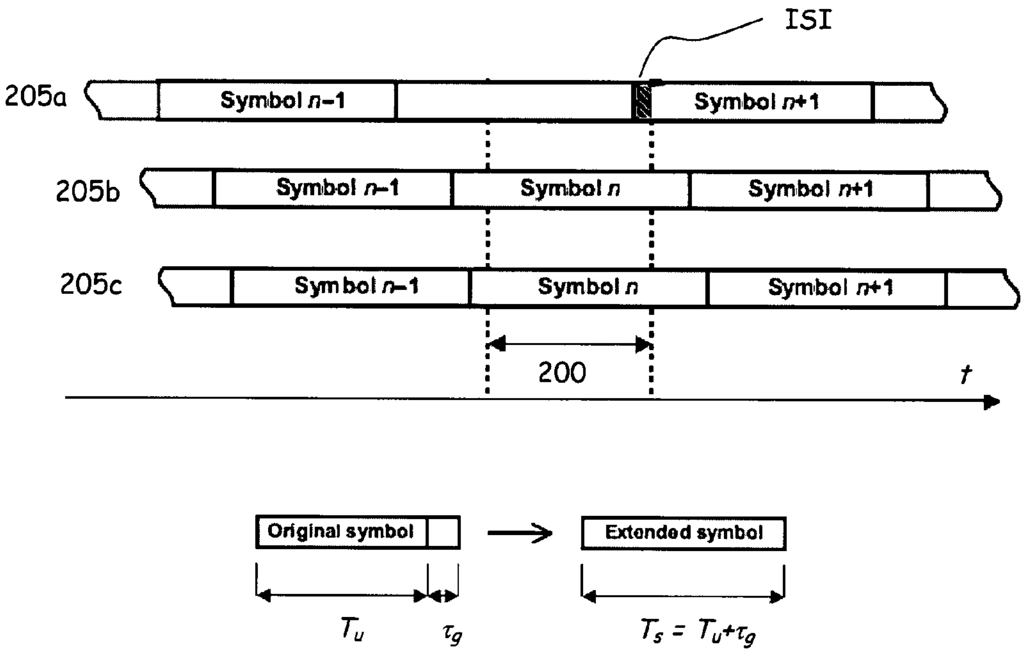
FIG. 2 illustrates the concepts of "guard time interval" and "FFT window positioning"

Referring to FIG. 2, as discussed in the foregoing, in order to demodulate the received signals, the DVB-H receiver 105 evaluates the symbol during the symbol time. This involves properly positioning an FFT evaluation time window 200, having a time duration equal to the useful symbol time $T_u$ of the signal.

Different time delays are associated with different signals 205*a*, 205*b*, and 205*c* that arrive at the DVB-H receiver following different paths, corresponding for example to the transmission stations 110, 120*a*, and 120*b*, and possibly to echoes of a same transmitted signal. Just three signals are for simplicity shown in the drawing, however in a real case the number of signals that a generic receiver receives may be higher. In order to allow, as much as possible, a constructive combination of the different signals arriving at the receiver, a guard time interval $\tau_g$ is provided for, thereby the useful symbol time $T_u$ of the signal is cyclically extended to obtain an extended symbol time $T_s$ by adding a cyclic extension or a cyclic prefix to every symbol, preceding or following the useful part of each symbol and containing a repetition of the data at the end, or respectively at the beginning of the useful symbol part. In other words, part of the symbol is copied from the beginning of the symbol to the end, or from the end of the symbol to the beginning.

With the provision of the guard interval $\tau_g$, the DVB-H receiver can position the FFT window (having a duration time lower than the extended symbol time), in such a way as to reduce ISI.

In particular, the DVB-H receiver is synchronized in two phases: in a first phase, an initial synchronization is performed, in which the receiver is temporally aligned to the symbol rate; in a second phase, a secondary synchronization is performed, in which the receiver positions the FFT window for demodulating the received signal.

The window can be for example positioned according to one of the methods disclosed in the above-cited paper of R. Brugger and D. Hemingway. The Applicant has found that a preferred solution for a DVB-H system is to change in time the position of the FFT window, in particular based on the attempt to maximize the signal-to-noise ratio.

Once the position of the FFT window has been determined, the DVB-H receiver calculates a useful received signal C as the sum of all the received signals $C_i$ that contribute constructively ("constructive contributions"), i.e. the received signals that fall within the FFT window. Those signals that are received with such a delay that cannot be compensated by the guard time cause a worsening of the received signal, and are therefore regarded as interferential contributions; the interference I is calculated as the sum of these interferential contributions. A DVB-H receiver may consider as constructive contributions not only the received signals that fall within the FFT window, but also signals that are received with a delay higher than the guard time, provided that the delay does not exceed one third of the useful time $T_u$; a different weight (less than 1) is nevertheless assigned to these signals; in formulas, the useful signal C and the interference I are expressed as:

$$C=\Sigma_i W_i C_i$$

$$I=\Sigma_i (1-W)_i C_i$$

where the i-th weight coefficient $W_i$ assigned to the i-th received signal. The weight $W_i$ may be calculated as follows (the variable t identifying the time at which a generic signal i is received):

$$W_i = \begin{cases} 0 & \text{if } t \le t_0 \\ 1 & \text{if } t_0 < t \le t_0 + T_u \\ 0 & \text{if } t_0 + T_u < t \end{cases}$$

It has to be noted that in the FFT window has been considered of rectangular shape for the sake of simplicity, but it could have a different shape, such as a trapezoidal shape, thus including different weights.

A typical guard time is of 224 µs, corresponding to signal paths differing of about 70 Km. In a scenario like that depicted in FIG. 1, which is rather true-to reality, the elevated transmission stations, like the transmission station 110, having a wide radio range, often happen to be away from, e.g., urban areas like the urban area 125*a* a distance of the order of a few hundreds of kilometers; thus, while the signals received by the generic DVB-H receiver and coming from the low-height sites like the sites 120*a*, 120*b* (either directly or after signal reflections) are generally rather close to each other, in terms of time delay, and thus they fall within the FFT window, the signal(s) coming from the elevated transmission station(s), like the site 110, having to travel for a significantly longer path arrives at the DVB-H receiver with a significant time delay, of more than the typical guard time value of 224 µs.

In particular, in a scenario like that depicted in FIG. 1, the strongest signal (or one of the strongest signals) received by a generic DVB-H receiver like the mobile terminal 105 may be the signal irradiated by an elevated transmission station, like the station 110, but this signal is at the same time the most delayed, compared to the signals received from the low-height, closer transmission stations 120*a*, 120*b*.

According to an embodiment of the present invention, in the DVB-H network planning phase respective transmission delays are calculated for the different transmission stations, and the calculated transmission delays are then applied in the DVB-H transmission stations, adapted to render the different signals, transmitted by the different stations and received by a generic DVB-H receiver, as much as possible synchronized with one another, or at least less delayed from one another.

For the purposes of the present invention, with "transmission delay" it is generally intended a transmission temporal shift, which with respect to a reference transmitting station can be in one direction ("lead"), i.e. an anticipation of the signal transmission, or in the other ("lag"), i.e. a delay of the signal transmission.

Figure 3:
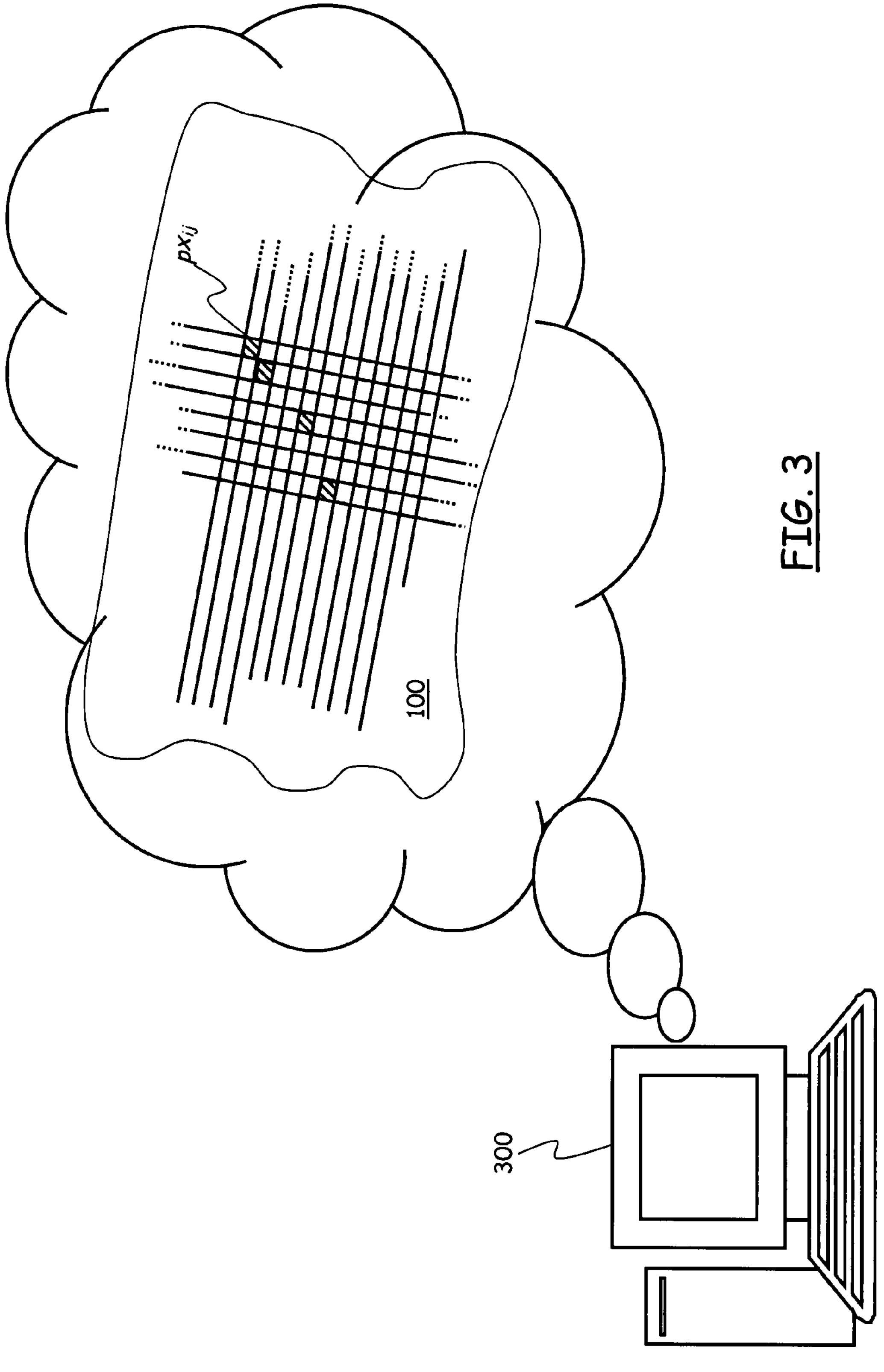
FIG. 3 schematically shows a subdivision into elementary area elements, or pixels, of the portion of geographic area of FIG. 1 used in a network planning phase, according to an embodiment of the present invention.

Referring to FIG. 3, there is schematically depicted a data processing apparatus 300, which, in one embodiment of the present invention, is used for planning the DVB-H network (for example in respect of the portion of geographic area 100 shown in FIG. 1). The data processing apparatus 300 may be a general-purpose computer, like a Personal Computer (PC), a workstation, a minicomputer, a mainframe, and it may as well include two or more PCs or workstations networked together.

Figure 4:
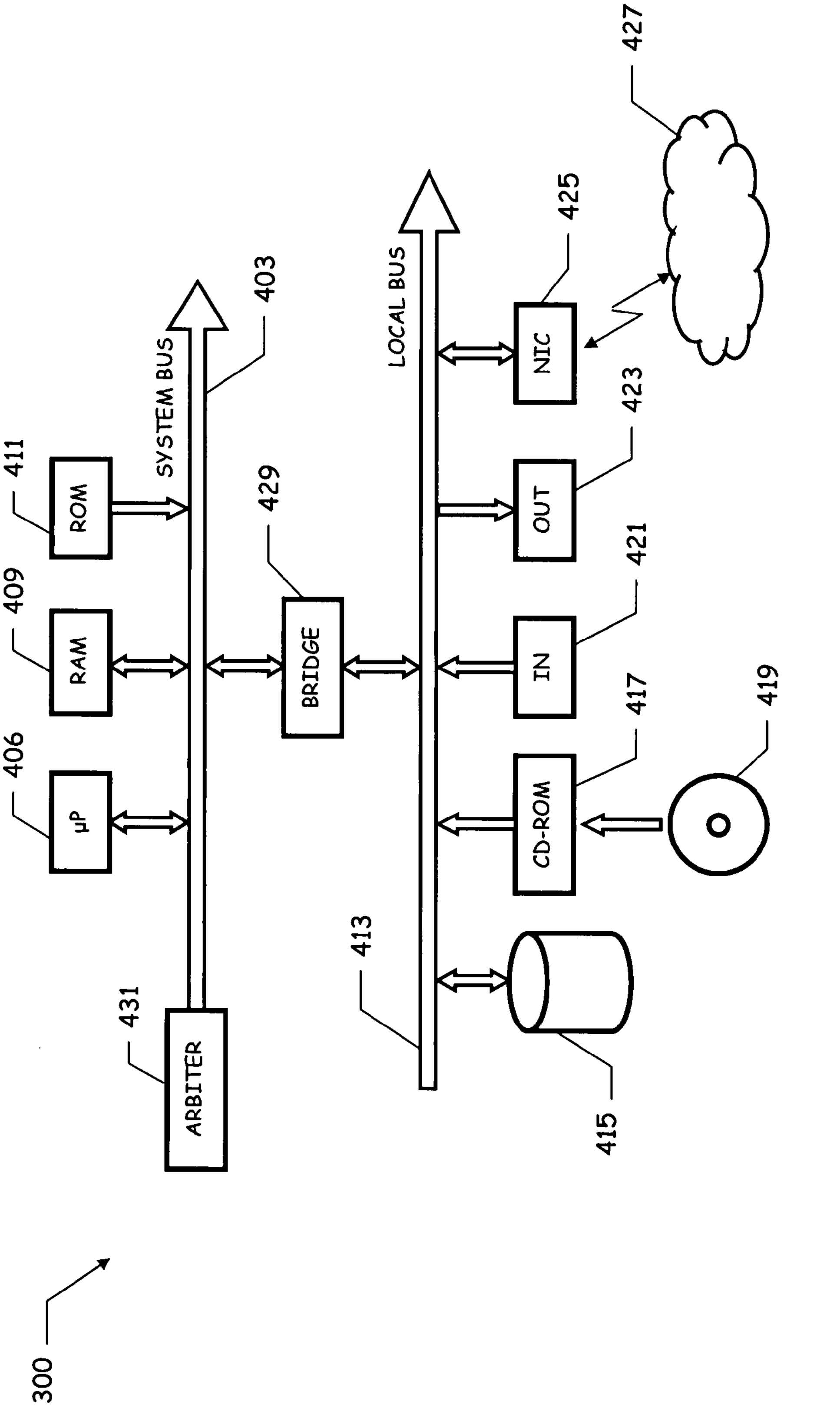
FIG. 4 schematically shows the main functional components of a data processing apparatus that, suitably programmed, is adapted to carry out a DVB-H network planning method according to an embodiment of the invention.

The general structure of the data processing apparatus 300 is schematically depicted in FIG. 4. The data processing apparatus 300 comprises several units that are connected in parallel to a system bus 403. In detail, one (possibly more) data processor (□p) 406 controls the operation of the computer 300; a RAM 409 is directly used as a working memory by the microprocessor 406, and a ROM 411 stores the basic code for a bootstrap of the computer 300. Peripheral units are connected (by means of respective interfaces) to a local bus 413. Particularly, mass storage devices comprise a hard disk 415 and a CD-ROM/DVD-ROM drive 417 for reading CD-ROMs/DVD-ROMs 419. Moreover, the computer 300 typically includes input devices 421, for example a keyboard and a mouse, and output devices 423, such as a display device (monitor) and a printer. A Network Interface Card (NIC) 425 is used to connect the computer 300 to a network 427, e.g. a LAN. A bridge unit 429 interfaces the system bus 403 with the local bus 413. Each microprocessor 406 and the bridge unit 429 can operate as master agents requesting an access to the system bus 403 for transmitting information; an arbiter 431 manages the granting of the access to the system bus 403.

In particular, the data processing apparatus 300 is adapted to execute a software tool designed for the DVB-H network planning.

With reference again to FIG. 3, the planning of the DVB-H network calls for ideally subdividing the geographic area of interest into relatively small, elementary area elements or pixels $px_{ij}$ (where i and j are two indexes which take integer values to span the area of interest), each pixel being an elementary, unit (in the shown example, square) area of predefined width, e.g. a 50 m by 50 m square.

In the planning of the DVB-H network, the generic pixel $ps_{ij}$ is assumed to represent a virtual DVB-H receiver, i.e. it is assumed that, in the generic pixel, at least one DVB-H receiver is located.

According to an embodiment of the present invention, described in detail later on, in the planning phase of the DVB-H network, each pixel, i.e. each virtual DVB-H receiver, "notifies" (to the transmission stations) the experienced situation in terms of delays of the received signals, and requests the involved transmission stations to delay or anticipate the signal transmission, in such a way as to reduce the signal delay.

In particular, the signals getting to a generic pixel of the area of interest from two transmission stations can be synchronized by introducing a transmission delay provided that the pixel distance from the two transmission stations is less than the duration integration window; by "integration window" it is meant the time interval within which all the received signals (echoes) are regarded as constructive contributions (the duration of the integration window may be equal to the useful time Tu extended by the guard time $\tau_g$, or slightly longer, as discussed in the foregoing, and in general it depends on the specific DVB-H receiver). Typically (but not necessarily), the integration window coincides with the FFT window.

Figure 5:
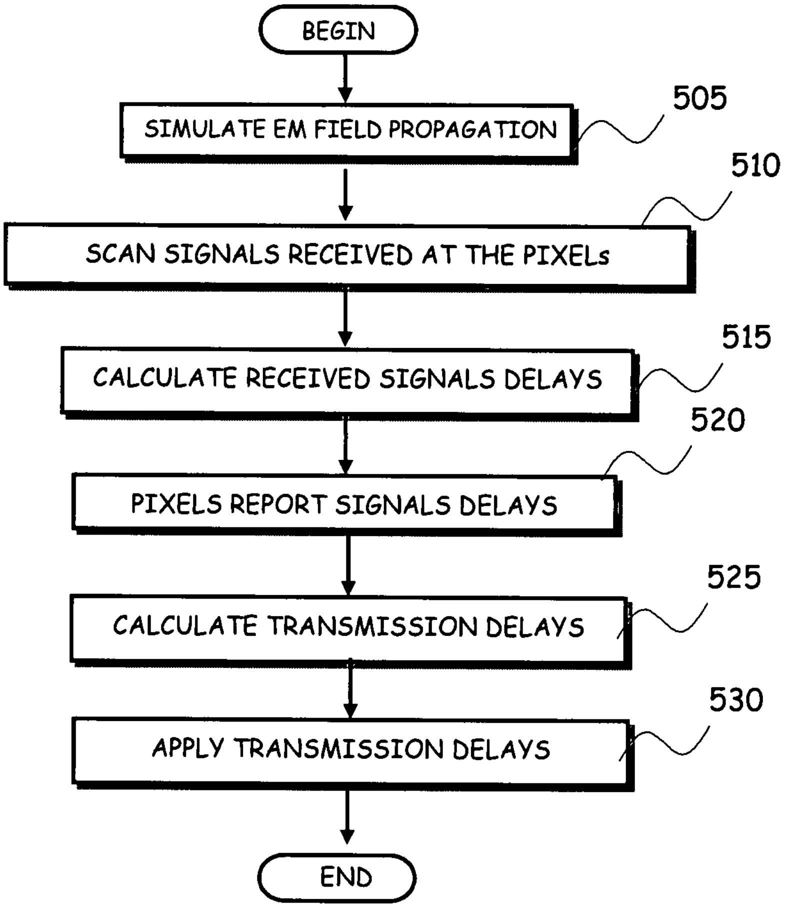
FIG. 5 is a schematic flowchart of a DVB-H network planning method according to an embodiment of the present invention.

The schematic flowchart of FIG. 5 shows the main steps of a DVB-H network planning method according to an embodiment of the present invention, comprising a phase of calculation of DVB-H stations transmission delays adapted to synchronize the signals received at the generic pixel from the different DVB-H transmission stations.

Firstly, based on a current DVB-H network topology (number and locations of transmissions sites, radio equipment thereof, etc.) and data related to the nature of the geographic area being planned (describing the morphology of the territory, like orography, the presence of rivers, woods, forests, the density of buildings, etc.), a distribution of the electromagnetic field originating from the transmission stations is simulated, for every pixel of the area under planning (block 505).

Then, the pixels of the area under planning are investigated. The generic pixel is, as mentioned above, assumed to be a virtual DVB-H receiver; for each pixel, the radio signals that, based on the electromagnetic field propagation simulation, are received at that pixel are considered (block 510), and the respective delays are calculated (block 515).

Each pixel reports the respective situation, in terms of delays of the received signals, to the transmission stations (block 520).

Based on the situation reported by the various pixels, an attempt is made to synchronize the signals received by the different pixels, by calculating transmission delays for the different transmission stations (block 525). The transmission delays are then applied to the transmission stations (block 530).

A procedure according to an embodiment of the present invention, for calculating the transmission delays to be applied to the various DVB-H transmission stations will be now described.

As mentioned above, the signals getting to a generic pixel of the area of interest from two transmission stations can be synchronized, introducing a transmission delay, provided that the pixel distance from the two transmission stations is less than the integration window duration. Let DSinc denotes the width of the integration window.

Figure 6A:
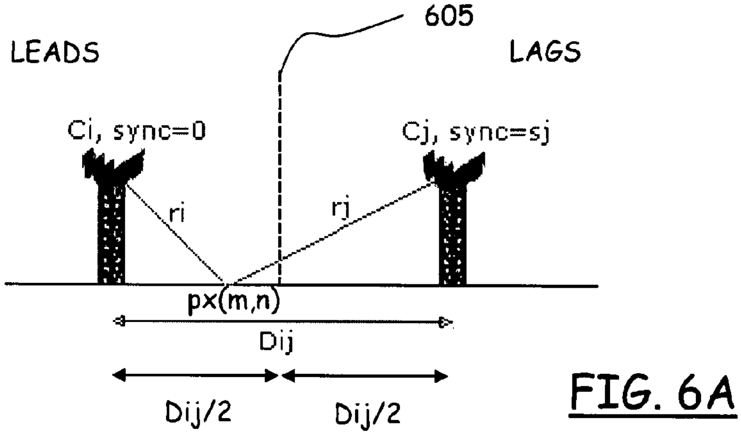
FIGS. 6A, 6B and 6C schematically depict a simplified, two-dimensional scenario relied upon for explaining a method of calculating transmission delays to be assigned to DVB-H transmission stations for reducing the interference experienced in the elementary area elements of the area of interest, according to an embodiment of the present invention.

With reference to FIG. 6A, let a two-dimensional configuration be considered, for the sake of simplicity, in which two generic transmission stations, denoted Ci and Cj, are aligned and at a distance Dij from one another.

Let it be assumed that the transmission station Ci is the one which, among all the existing transmission stations, is the "best server" in the greatest number of pixels of the area of interest, i.e. the signal irradiated by the transmission station Ci is perceived as the strongest signal in the greatest number of pixels compared to the signals irradiated by the other transmission stations, including the transmission station Cj. The pixels where a generic DVB-H transmission station is the best server form, altogether, the "DVB-H cell" associated with said DVB-H transmission station.

A zero transmission delay is assigned to the transmission station Ci, i.e. to the cell having the widest coverage. The transmission delay to be assigned to the generic other transmission station Cj is then calculated.

Let sj denote the transmission delay that ensures the synchronization between the signals irradiated by the two considered transmission stations Ci and Cj.

Let the plane of FIG. 6A be halved by the line 605, which is at a same distance Dij2 from the two transmission stations Ci and Cj; the half-plane on the left of the line 605 (the half-plane [LEADS] of the leads) includes the pixels in which the signal coming from the transmission station Cj should be anticipated in order to be synchronized with the signal coming from the transmission station Ci, whereas the half-plane on the right of line 605 (half-plane [LAGS] of the lags) includes pixels in which the signal coming from the transmission station Cj should be delayed in order to be synchronized with the signal coming from the transmission station Ci.

Let a generic pixel px(m,n) be considered, included in the DVB-H cell of the transmission station Ci (i.e., a pixel where the transmission station Ci is the best server), and at which an interferential echo from the transmission station Cj is also received. Let $r_i^{m,n}$ denote the distance of the pixel px(m,n) from the transmission station Ci, and $r_j^{m,n}$ the distance of the pixel px(m,n) from the transmission station Cj.

If, whichever the pixel px(m,n) considered, it results:

$$r_j^{m,n}+s_j-r_i^{m,n}<D\text{Sinc}\,\forall px(m,n)\in[\text{LEADS}]$$

$$r_i^{m,n}-r_j^{m,n}-s_j<D\text{Sinc}\,\forall px(m,n)\in[\text{LAGS}] \quad (1)$$

then a transmission delay sj exists that allows synchronizing the signal transmitted by the transmission station Cj to the signal transmitted by the transmission station Ci.

From the two inequalities (1) it can be deduced that, whichever the pixel px(m,n) considered, in all the pixels of the cell associated with the transmission station Ci the transmission delay sj necessary for synchronizing the signals of the transmission station Cj to those of the transmission station Ci shall satisfy the condition:

$$\text{MAX}(r_i^{m,n}-r_j^{m,n})-D\text{Sinc}<s_j<D\text{Sinc}-\min(r_j^{m,n}-r_i^{m,n})$$

Figure 6B:
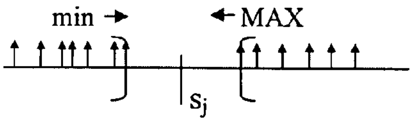

In the pixels located along the line 605, the above condition becomes:

$$-D\text{Sinc}<s_j<D\text{Sinc}$$

which means that the transmission delay (lead or lag) of the transmission station Cj can at most be equal to the width of the integration window DSinc. In general, adopting the following definitions:

$$\text{minimum}=\text{MAX}(r_i^{m,n}-r_j^{m,n})-D\text{Sinc}$$

$$\text{Maximum}=D\text{Sinc}-\min(r_j^{m,n}-r_i^{m,n})$$

if Maximum>minimum, then any value within the interval [minimum,Maximum] can be chosen as the transmission delay sj for the transmission station Cj; for example, referring to FIG. 6B, the transmission delay sj can be chosen to be:

$$s_j=\frac{\text{Maximum}+\text{minimum}}{2}.$$

Figure 6C:
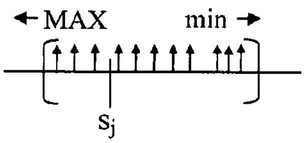

If instead Maximum<minimum, then there is no valid interval in which to choose a transmission delay sj adapted to synchronize the signals irradiated by the two transmission stations Ci and Cj in all the pixels of the cell of the transmission station Ci; in this case, an attempt can be made to synchronize the signals transmitted by the two transmission stations Ci and Cj at least in a subset of the pixels of the cell of the transmission station Ci. To this purpose, one or more counters can be used to keep track of the pixels for which the transmission delay necessary to synchronize the received signals falls in the interval [Maximum;minimum]; in particular, two count variables countPix_dxMax and countPix_sxMin can be used: the first count variable countPix_dxMax is used to count the number of pixels which request to lead the signals irradiated from the transmission station Cj, whereas the second count variable countPix_sxMin is used to count the number of pixels that request to lag the signals. The transmission delay that can be assigned to the transmission station Cj can then be calculated as (FIG. 6C):

$$s_j = \text{Maximum} + \frac{\text{countPix\_dxMax}}{\text{countPix\_dxMax} + \text{countPix\_sxMin}} \cdot (\text{minimum} - \text{Maximum}).$$

In other words, if the number countPix_dxMax of pixels that request to lead the signals is higher than the number countPix_sxMin of pixels that request to lag the signals, then the transmission delay sj is essentially set equal to the value Maximum, calculated as defined above; on the contrary, if the number countPix_dxMax of pixels that request to lead the signals is lower than the number countPix_sxMin of pixels that request to lag the signals, then the transmission delay sj is essentially set equal to the value minimum calculated as defined above.

The transmission delay can be calculated in the way described above for all the transmission stations of the DVB-H network under planning.

In particular, according to an embodiment of the present invention, the transmission stations of the area under planning are sorted in order of decreasing number of pixels where they are best server (i.e., the DVB-H cells are sorted in order of decreasing area of coverage); a zero transmission delay is assigned to the transmission station having the widest cell; the second transmission station in the rank is then taken, and the transmission delay to be assigned to that transmission station is calculated, in the way just described; then the third transmission station in the rank is taken, and the transmission delay is calculated considering the first and the second transmission stations; the procedure is repeated for all the remaining transmission stations; for the generic n-th remaining station, its delay is calculated considering the n−1 stations that precede it in the rank. At the end, transmission delays have been calculated in respect of all the transmission stations. The transmission delays thus calculated can then be applied to the respective transmission stations of the DVB-H network under planning.

It is observed that, following this approach, the calculated transmission delays may depend on the order the transmission stations of the area under planning are sorted and then scanned.

According to a preferred embodiment of the present invention, in order to calculate transmission delays that are less or not dependent on the scanning order of the transmission stations, the above-described procedure is used to calculate an initial vector of transmission delays, i.e. a starting solution, which is then subjected to a process of refinement.

In particular, in an embodiment of the present invention, the refinement process is based on the concept of "spin glasses".

In the art, by "spin glass" there is intended a material formed of many particles, each of which is a little magnet having a certain orientation, i.e. a certain "spin". The magnets composing the material are in a disordered state, because there are forces (like for example an external field, or forces arising from the interaction with the surrounding magnets) which prevent them from having their spins all aligned to each other. A spin glass is further defined as "frustrated", because its equilibrium state is instable, and the magnets constantly oscillate between two equilibrium states without ever stopping in a stable state.

A spin glass thus has several equilibrium states, depending on the available energy, i.e. on the temperature T.

The name "spin glass" derives from the fact that the glass, which is a substance that is fluid at high temperatures, never achieves a crystalline state when cooled, remaining instead amorphous.

Similarly, in a spin glass the process of stabilization of the spin of a generic magnet, when the temperature T lowers, terminates in the best state that is locally compatible, but this state is never the best state, in absolute sense.

The behavior of spin glasses can be described using statistical mechanics techniques. In particular, the behavior of the spin glasses is similar to that of the neurons in a Hopfield network.

According to an embodiment of the present invention, the generic cell of the DVB-H network under planning is regarded as a particle, i.e. a magnet of a spin glass. The temperature T of the spin glass is used, in an embodiment of the invention, as a casual perturbation parameter (e.g. any deterministic parameter affecting the computation, such as the delay itself, the interference measured on the different pixels, or the dimension in pixels of the cells' coverage), whose value determines the extent to which the number of pixels that are assigned to each DVB-H cell is casually perturbated compared to the numbers calculated as a result of the electromagnetic field propagation simulation, assigning the pixels to the different transmission stations depending on whether they are best servers in those pixels (this represents the deterministic solution).

In other words, in an embodiment of the present invention, the number of pixels that are assigned to a generic DVB-H cell is varied, compared to the deterministic solution, depending on a temperature parameter T: the higher the temperature value, the more the number of pixels assigned to the generic cell is casually perturbated compared to the deterministic solution. For example, the casually perturbated number of pixels may be selected randomly in a range that, for a temperature value equal to a predetermined maximum value, goes from the actual (i.e., deterministically calculated) number of pixels to twice such number; the width of the range in which the casually perturbated number of pixels may be randomly selected decreases as the temperature decreases.

Thus, fictitious numbers of pixels are from time to time assigned to the various DVB-H cells of the area under planning, depending on the value of the temperature parameter; such fictitious numbers of pixels tend however to be closer and closer to the actual numbers of pixels as the temperature decreases from the maximum value to the minimum value.

According to an embodiment of the present invention, the process of refinement of the starting transmission delay solution is iterative: for each temperature value from the predetermined maximum value to the minimum value, the transmission delays are calculated in the way described above, but since the number of pixels assigned to each DVB-H cells is randomly perturbated, the scan order of the transmission stations changes at every iteration, and thus also the calculated transmission delays changes. At each iteration, the quality of the solution found is evaluated, in terms of level of interference experienced in the different pixels of the area of interest, and the solution found at the generic iteration is memorized if it represents the best fit of the function to be optimized (for example, if the percentage of pixels, i.e., of the area under planning, which do not suffer from interference improves).

In other words, according to a preferred embodiment of the present invention, the different DVB-H cells are regarded as particles of a spin glass, which are initially "heated", i.e. more pronouncedly perturbated, and then progressively cooled down, i.e. perturbated less, so that the order in which the DVB-H cells are from time to time scanned in the process of calculating the transmission delays to be assigned to the different transmission stations changes from iteration to iteration. In this way, a solution in terms of transmission delays can be found that is less dependent on the particular criterion of DVB-H cells scan order adopted for calculating the transmission delays.

It has to be noted that the above-described "spin glass" technique is only one possible refinement technique but any other technique for finding different solutions, in terms of different possible combinations of transmission delays, can be applied as well.

In a still preferred embodiment of the invention, in addition to the used refinement technique (spin glass approach or other), a technique based on the concepts of genetic algorithms is also applied, to further refine the calculated transmission delays.

As known in the art, a genetic algorithm is an evolutional and self-replicating structure. The concept of genetic algorithm roots on the theory of the natural selection, applied to some solutions, referred to as "parents", to a target problem to be solved having a digital "genome" defined by sequences of bits or, generically, by numeric information or data structures called "chromosomes". The parent solutions may be subjected to an evolutional process for generating a "child solution"; a possible evolutional process is "cross-over", which involves the generation of the child solution having the genome formed by a casual mix of the genome of two parent solutions. Another possible evolutional process is casual mutation of one or more bits of the genome of a parent solution. Among the child solutions, those that better solve the target problem are selected, and the selected child solutions are again submitted to an evolutional process, while the bad child solutions are discarded. The process continues until the solutions to the target problem are found, or a predetermined time is lapsed.

In the context of the present invention, the chromosome is one particular calculated transmission delay to be assigned to a transmission station of the DVB-H network; each sequence of transmission delays defines a genome, determining a respective interference state in the pixels of the area under planning. To each solution, a respective score is assigned, given by the percentage of the area under planning that satisfies predetermined criteria of interference. Each solution that has a score that is better than the scores of previously found solutions is added to a list of solutions that are submitted to cross-over, so to generate new generations of solutions.

With reference to FIGS. 7A, 7B, 7C and 7D, a method according to an embodiment of the present invention is described in detail, for calculating the transmission delays to be assigned to the different transmission stations of a DVB-H network so as to significantly reduce the interference experienced by DVB-H receivers in the area of interest.

Firstly, the propagation of the electromagnetic field in the area of interest is simulated (703), and the best server areas of the different DVB-H transmission stations are calculated (block 705).

The transmission delays to be assigned to the different DVB-H transmission stations are then calculated, in the way described in the foregoing (block 707). In particular, the DVB-H cells are sorted in order of decreasing number of pixels included in the respective best server areas. Before calculating the transmission delay to be assigned to the different transmission stations, all the pixels of the area of interest are scanned: those pixels for which the useful signal C and the interference I differ in intensity less than a predetermined threshold, notify (e.g., by means of a "virtual" SMS) the difference in the physical distances of the pixel from the two involved cells. In this way, only pixels suffering from a significant interference, exceeding a predetermined limit, request the transmission stations to lead/lag the transmission of signals. Considering the generic pixel which suffers an excessive interference, the notification is sent to both the transmission station that is the best server in that pixel and to the transmission station(s) from which interferential echoes (falling outside the integration window) are received at the considered pixel.

The notification sent by the generic pixel includes the information about the difference between the arrival times of the signal from the best server and of the generic interfering signal.

In particular, considering the scenario of FIG. 6A, the notification sent by the generic pixel to the transmission station that irradiates the interfering signal, i.e. the transmission station Cj, which, compared to the transmission station Ci, has a difference in distance from the pixel px(m,n) equal to $(r_j^{m,n}-r_i^{m,n})$, is a lead request if $(r_j^{m,n}-r_i^{m,n})>0$, otherwise it is a lag request. A similar notification is also sent to the transmission station Ci, but in this case the distance that is communicated is $(r_i^{m,n}-r_j^{m,n})$; the information communicated by the pixel to the interfering transmission station that irradiates the interfering signal is the pixel distance from the best server station minus the pixel distance from the interfering station, whereas the information communicated by the pixel to the best server station is the pixel distance from the interfering station minus the pixel distance from the best server station.

At the end of the pixels scan, each DVB-H transmission station has a list of lead requests, and a list of lag requests, that are received from both the pixels of its cells (where the considered transmission station acts as best server), and from pixels of other cells (where it is an interfering station).

A predefined, reference transmission delay, for example equal to zero, is assigned to the first cell of the list (the cell which has the widest best server area coverage). The transmission delays to be assigned to the remaining transmission stations are calculated in successive steps, considering at each iteration another cell, taken from the list where the cells are sorted in order of decreasing area coverage. For each cell, the notifications already received from the preceding cells in the list and from the considered cell are considered. Among the lead requests, the maximum MaxDist of the distances that are included in the notifications sent to the considered cell by the various pixels is searched; similarly, among the lag requests, the minimum MinDist of the communicated distances is searched.

Finally, it is assessed if a valid interval exists wherein the transmission delay of each cell can vary, and, in the affirmative case, the transmission delay is set equal to the average within the determined interval, as previously described. If no such interval exists (because the minimum value exceeds the maximum value), then a transmission delay is assigned which is closer to the calculated maximum (DSinc−MinDist) the greater the number of lead requests, and closer to the calculated minimum (MaxDist−Dsinc) the greater the number of lag requests, as described in detail in the foregoing.

In this way, an initial vector of transmission delay values is calculated.

After having calculated the initial transmission delays, the DVB-H network planning is recalculated: the new arrival times of the signals irradiated from the transmission stations at the various pixels are calculated by applying to the transmission stations the calculated transmission delays. For each pixel, the new C/I factor is then calculated, which takes into account the calculated transmission delays (block 709).

The percentage of the area of interest where the newly calculated C/I is over a predetermined threshold is then calculated (the calculated percentage is the "covered area") (block 711); as a result, the set of pixels of the area of interest for which the calculated C/I is below the predetermined threshold is returned.

The found solution (in terms of the calculated transmission delays) is then saved, and the calculated transmission delays are assigned to each transmission station (block 713).

Then, the calculated solution is inserted in a solutions list (block 715); the solutions included in such a list will be exploited as parent solutions in the implementation of the genetic algorithm described below, to generate child solutions.

A loop is then entered, where the ordering of the list of DVB-H cells is repeatedly casually perturbed, compared to the initial situation, and the transmission delays are each time recalculated.

In particular, as discussed above, the temperature parameter is used to casually perturb the ordering of the DVB-H cells adopted at each iteration for calculating the transmission delays; for example, in an embodiment of the present invention, the temperature parameter is exploited to casually perturb the width of the best server areas of the various cells. Other possibilities of use of the temperature parameter for introducing casual perturbation exist; for example, the temperature parameter might be used to introduce casual perturbations in the arrival times of the signals irradiated by the transmission stations at the pixels.

At the beginning of the loop, the temperature parameter T is set equal to a predetermined maximum temperature value (block 717), which corresponds to the maximum possible perturbation of the initial solution (in terms of calculated transmission delays).

Then, it is assessed whether the covered area is over a predetermined threshold, for example equal to the 80% of the area of interest (block 719).

In the affirmative case (exit branch Y of block 719), the found solution (in terms of the calculated transmission delays) is then saved, and the calculated transmission delays are assigned to each transmission station (block 721). Then, the calculated solution is inserted in the solutions list (block 723); the solutions included in such a list will be exploited as parent solutions in the implementation of the genetic algorithm, to generate child solutions. The temperature parameter is then decreased (block 725) (of a predetermined value $T_{step}$), and, unless the temperature parameter has reached a predetermined minimum value (block 727), the loop is not exited (exit branch N of block 727).

If instead the covered area is not over the predetermined threshold (exit branch N of block 719 and connector J1 to the flowchart of FIG. 7B), a choice is made of whether to apply a genetic algorithm to generate a new solution from solutions already in the list; in particular, the choice is made randomly, possibly introducing a bias that alters the probability from 50/50 towards a preselected relative frequency (block 729).

In case the application of the genetic algorithm is selected (exit branch Y of block 729), a "child" solution is generated starting from two parent solutions (block 731); in particular, chosen at random a "mother" and a "father" solutions out of the solutions list, the child solution is built defining a breakpoint of the genomes of the mother and father solutions (which, as mentioned in the foregoing, is represented by the vector of transmission delays of the two solutions); the breakpoint, defined as "cross-point", is determined casually, for example according to the following formula:

crosspoint=(int)((dim_master+alea((dim_master)))/2.0)

where dim_master is an integer equal to the number of transmission stations in the area of interest, and thus to the cardinality of the vector of transmission delay, and alea((dim_master)))/2.0) denoted a statistic function that gives a number chosen randomly in the number range between −dim_master and +dim_master.

Thus, the cross-point is in the second half of the vector of transmission delays. The transmission delay to be assigned to the transmission stations up to the cross-point is taken from the mother solution, whereas the transmission delay to be assigned to the remaining transmission stations is taken from the father solution.

Then, the DVB-H network planning is recalculated: the new arrival times of the signals irradiated from the transmission stations at the various pixels are calculated, after applying to the transmission stations the calculated transmission delays. For each pixel, the new C/I factor is then calculated taking into account the calculated transmission delays (block 733).

The percentage of the area of interest where the factor C/I is over a predetermined threshold (i.e., the covered area) is then again calculated (block 735); the set of pixels of the area of interest for which the calculated C/I is below the predetermined threshold is returned.

Figure 7A:
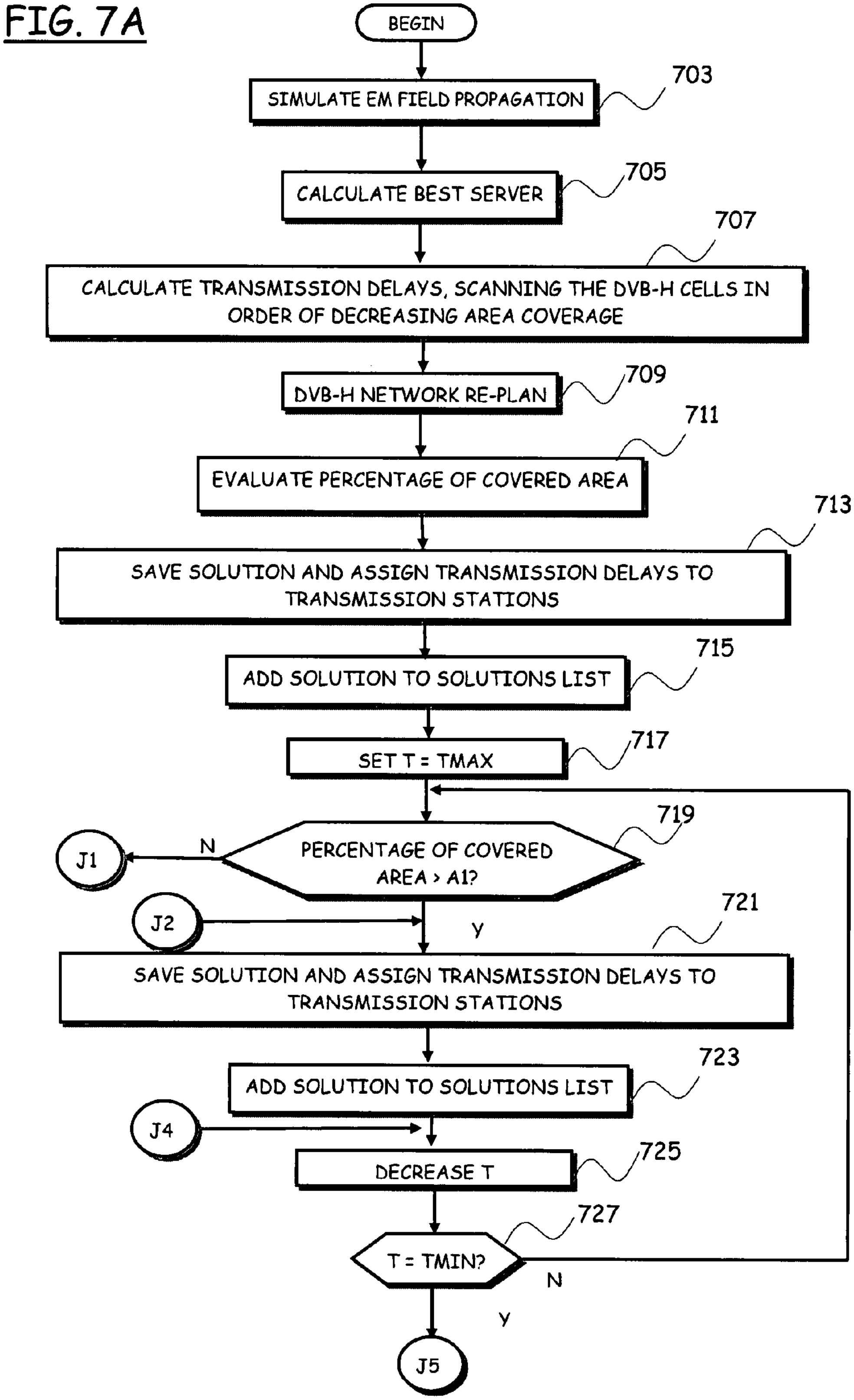

If the covered area exhibits an increase compared to a starting situation, taken as a reference (for example, a situation in which all the transmission delays are set to zero) (block 737, exit branch Y, and connector J2 back to the flowchart of FIG. 7A), the found solution (in terms of the calculated transmission delays) is then saved, and the calculated transmission delays are assigned to each transmission station (block 721). Then, the calculated solution is inserted in the solutions list (block 723). Then, as in the previous iteration of the loop, the temperature parameter is decreased (block 725), and, unless the temperature parameter has reached a predetermined minimum value (block 727), the loop is not exited (exit branch N of block 727).

Figure 7C:
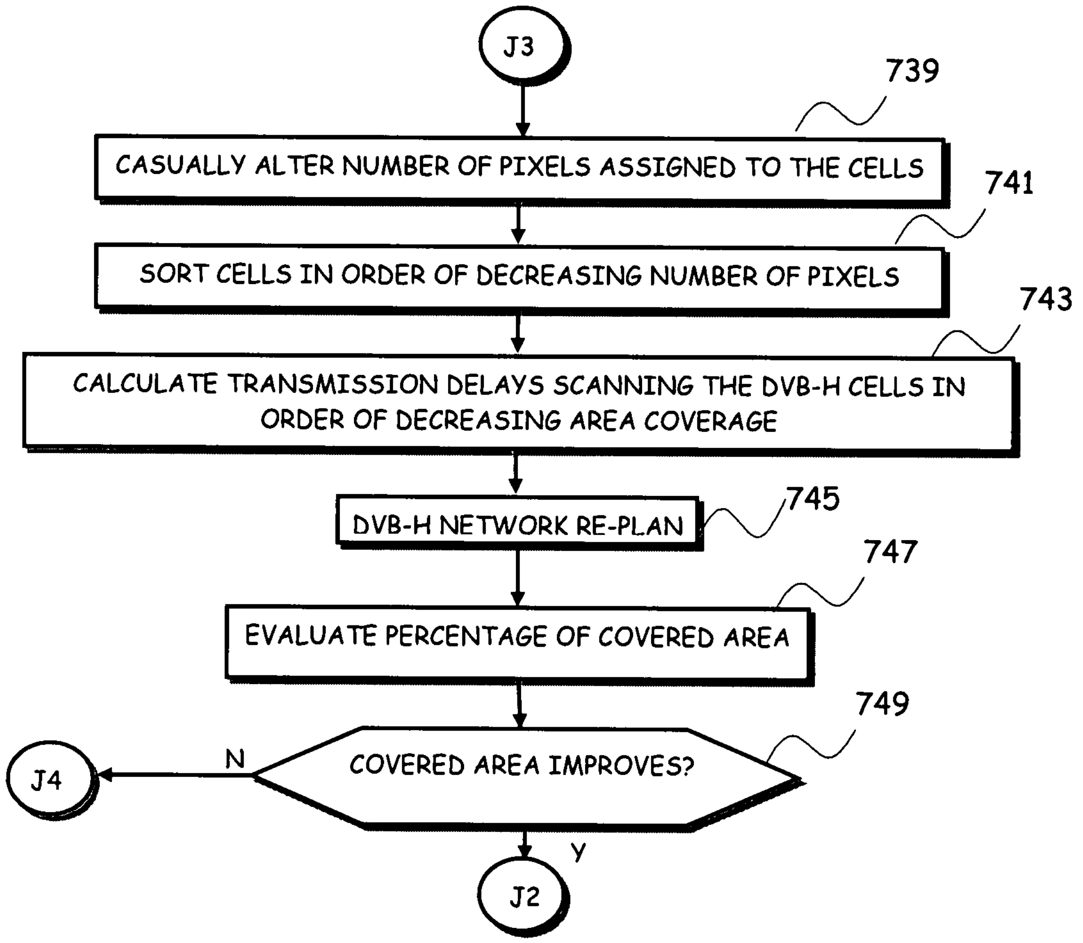

If instead the covered area is not improved (exit branch N of block 737, and connector J3 to the flowchart of FIG. 7C), the number of pixels fictitiously assigned to each DVB-H cell is altered (block 739). The perturbations to the number of pixels fictitiously assigned to the cells are applied assigning to each cell a fictitious number of pixels npix_ph, starting from the actual number of pixels calculated as a result of the electromagnetic field propagation simulation, perturbing the actual pixel number with a casual component; for example, considered the generic DVB-H cell, the fictitious number of pixel npi ph may be calculated as follows:

$$\text{npix\_ph} = npix + alea\left(\frac{T - T_{min}}{T_{MAX} - T_{min}} \cdot npix\right)$$

where npix is the actual number of pixel of the DVB-H cell. It can be appreciated that the entity of the perturbations depends on the temperature parameter T. Initially, for high values of the temperature parameter (values equal or close to the maximum temperature $T_{MAX}$), the range wherein the fictitious number of pixels npix_ph varies is from the actual number of pixels npix and twice this number; as the temperature falls toward the minimum temperature value $T_{min}$, the entity of the perturbations decreases, and, when the temperature has reached the minimum temperature, the fictitious number of pixels npix_ph coincides with the actual number of pixels npix.

The DVB-H cells are then sorted in order of decreasing (fictitious) number of pixels (block 741). The transmission delays to be assigned to the different DVB-H transmission stations are then calculated, in the way described in the foregoing (block 743). The DVB-H network planning is recalculated: the new arrival times of the signals irradiated from the transmission stations at the various pixels are calculated, after applying to the transmission stations the calculated transmission delays. For each pixel, the new C/I factor is then calculated, taking into account the calculated transmission delays (block 745).

The percentage of the area of interest where the C/I is over a predetermined threshold is then calculated (the calculated percentage is the "covered area") (block 747); the set of pixels of the area of interest for which the calculated C/I is below the predetermined threshold is returned.

If the covered area is improved compared to the reference situation (block 749, exit branch Y and connector J2 back to the flowchart of FIG. 7A), the found solution (in terms of the calculated transmission delays) is then saved, and the calculated transmission delays are assigned to each transmission station (block 721). Then, the calculated solution is inserted in the solutions list (block 723). Again, the temperature parameter is decreased (block 725), and, unless the temperature parameter has reached a predetermined minimum value (block 727), the loop is not exited (exit branch N of block 727).

If instead the covered area is not improved (exit branch N of block 737, and connector J4 back to the flowchart of FIG. 7A), the found solution is not saved, the calculated transmission delays are not assigned to the transmission stations, the solution is not added to the solutions lists; the temperature parameter is decreased (block 725), and, unless the temperature parameter has reached a predetermined minimum value (block 727), the loop is not exited (exit branch N of block 727).

If instead the temperature parameter has reached the predetermined minimum value, the algorithm exits the loop (block 727, exit branch Y and connector J5 to the flowchart of FIG. 7D), a normalization is performed (block 751): among all the DVB-H cells, the one having the minimum transmission delay is selected, and the transmission delays of the other cells are normalized to said minimum transmission delay.

Then, for each DVB-H cell, the transmission delay found is stored (block 753).

After that, the DVB-H network planning is recalculated: the new arrival times of the signals irradiated from the transmission stations at the various pixels are calculated, after applying to the transmission stations the calculated transmission delays. For each pixel, the new C/I factor is then calculated taking into account the calculated transmission delays (block 759), and the DVB-H cells are sorted in order of decreasing (actual) number of pixels assigned thereto (block 761).

In this way, a sequence of transmission delays is calculated, that can be assigned to each DVB-H transmission station, in order to reduce the eliminate, if possible, or at least to reduce the interference experienced in the various pixels of the area of interest.

Deploying such transmission delays in the actual network allows reducing the interference experienced on the field by the generic DVB-H receiver.

The present invention has been here described in detail making reference to an exemplary embodiment; however, those skilled in the art will understand that several modifications to the described embodiment, as well as alternative embodiments are conceivable, without departing from the scope of the invention defined in the appended claims.

For example, in an embodiment of the present invention, more than one iteration of the above-described loop may be performed for each value of the temperature parameter; this further increases the number of casual perturbations.

In particular, although described making reference to the planning of a DVB-H network, for setting the transmission delays of the different DVB-H transmission stations, the solution according to the present invention can in principle be applied also on the field: in such a case, the actual DVB-H receivers (e.g., the DVB-H mobile phones) may notify, e.g. by sending SMS messages, the detected situation of received signals; the method of the present invention might in such a case be exploited for adjusting the transmission delays of the transmission stations in order to reduce, on average, the interference experienced by the DVB-H receivers on the field.

The invention claimed is:

1. A method of planning a single frequency digital broadcasting network comprising at least one elevated transmission station and a plurality of low-height transmission stations, the method performed by a computer system comprising a processor and a memory encoded with program instructions that, when executed by the computer system, cause the computer system to perform the method, comprising:

subdividing a geographic area of interest into a plurality of area elements;

simulating, using the processor, a distribution of the electromagnetic field originating from the transmission stations in every one of said area elements;

in at least one area element of the geographic area of interest, calculating, using the processor, delays among signals received from the transmission stations based on the simulated electromagnetic field distribution; and based on said calculated delays, calculating, using the processor, transmission delays to be deliberately applied to the low-height transmission stations of said plurality, wherein said calculated transmission delays are adapted to reduce delays of the signals coming to the at least one area element from the elevated transmission station with respect to the signals coming from the low-height transmission stations; and applying said calculated transmission delays to the signals transmitted by the transmission stations of said plurality, wherein said calculating transmission delays comprises:

forming a first set of transmission delays, inserting the first set of transmission delays in a solution list, performing a refinement, using the processor, by varying randomly the set of the transmission delays, and updating the solution list.

2. The method of claim 1, wherein the method further comprises:

varying a number of times one parameter affecting the signals delays, thereby varying a corresponding number of times said signals delays; and repeating a corresponding number of times, based on varied delays, the step of calculating the transmission delays to be applied to the transmission stations of said plurality of transmission stations to form a corresponding number of sets of transmission delays, wherein the transmission delays of each set are adapted to reduce said signals delays.

3. The method of claim 2, further comprising randomly combining a first set and said number of sets to obtain a further set of transmission delays to be applied to the transmission stations of said plurality of transmission stations.

4. The method of claim 2, further comprising selecting one among a first set and said number of sets based on a number of area elements that perceive a global signal quality over a predetermined threshold, wherein a global signal is the sum of the signals received in said at least one area element.

5. The method of claim 2, wherein varying a number of times one parameter comprises randomly varying a number of times said parameter so as to randomly vary a corresponding number of times said signals delays.

6. The method of claim 2, wherein said parameter is one among transmission power, antenna pattern, antenna tilt, antenna azimuth, antenna height, antenna position and said signal delay.

7. The method of claim 5, wherein randomly varying a number of times said signals delays comprises:

defining a minimum value of said parameter, corresponding to a smaller perturbation of the signals delays;

defining a maximum perturbation parameter value, corresponding to a higher perturbation of the signals delays;

progressively decreasing the value of said parameter from a maximum to a minimum value; and randomly selecting the signal delays from a range of random selection of values corresponding to the value assigned to the parameter.

8. The method of claim 1, wherein calculating the transmission delays comprises:

a) determining a rank of the transmission stations of said plurality of transmission stations;

b) assigning to a first transmission station in the rank a reference transmission delay;

c) calculating the transmission delay to be assigned to a subsequent transmission station in the rank with respect to the reference transmission delay, so as to reduce in highest number of area elements of the geographic area of interest the delays between the signals received from the first transmission station and the subsequent transmission station; and d) repeating step c) for remaining transmission stations in the rank.

9. The method of claim 8, wherein the rank is based on area coverage of the transmission stations, the first transmission station in the rank being the transmission station of said plurality of transmission stations having a greatest area of coverage.

10. The method of claim 8, wherein repeating step c) for the remaining transmission stations comprises, for each remaining transmission station, calculating the delay to be assigned to said remaining transmission stations with respect to the reference transmission delay, so as to reduce in the highest number of area elements of the geographic area of interest, the delays among the signals received from said remaining transmission station and from all the transmission stations preceding said remaining transmission station in the rank.

11. The method of claim 9, further comprising:

modifying at least one time, the rank of the transmission stations; and repeating steps b) to d) using the modified rank, determining each time the transmission delays.

12. The method of claim 11, wherein modifying the rank comprises modifying the area coverage of the transmission stations.

13. The method of claim 12, wherein modifying the area coverage comprises randomly modifying the area coverage.

14. The method of claim 13, wherein randomly modifying the area coverage comprises:

defining a perturbation parameter;

defining a minimum perturbation parameter value, corresponding to a smaller perturbation of the area coverage;

defining a maximum perturbation parameter value, corresponding to a higher perturbation of the area coverage;

at each repetition of steps b) to d), assigning to the perturbation parameter a value progressively decreasing from a maximum to a minimum value; and randomly selecting the area coverage from a range of random selection of values corresponding to a value assigned to the perturbation parameter.

15. The method of claim 11, further comprising:

randomly combining transmission delay values determined at different repetitions of the steps b) to d) to obtain new transmission delay values.

16. The method of claim 1, wherein the digital broadcasting network is a digital video broadcasting network.

17. A data processing system capable of being adapted to implement the method according to claim 1, when programmed to execute a computer program comprising instructions adapted to implement said method.

18. A method of planning a single frequency digital broadcasting network comprising at least one elevated transmission station and a plurality of low-height transmission stations, the method performed by a computer system comprising a processor and a memory encoded with program instructions that, when executed by the computer system, cause the computer system to perform the method, comprising:

a) subdividing a geographic area of interest into a plurality of area elements;

b) simulating, using the processor, a distribution of an electromagnetic field originating from the transmission stations in every one of said area elements;

c) in at least one area element of the geographic area of interest, calculating, using the processor, received delays among signals received from the transmission stations based on the simulated electromagnetic field distribution;

d) sorting the transmission stations in a list;

e) based on said received delays and on the sorted list, calculating, using the processor, an initial vector of transmission delays;

f) subjecting the initial vector of transmission delays to a process of refinement consisting in repeatedly:

f1) perturbing the list of the transmission stations on the basis of a casual perturbation parameter;

f2) recalculating the transmission delays; and until the casual perturbation parameter has reached a predetermined minimum value, assigning the resulting transmission delays to each of the low-height transmission stations.

19. A computer program product tangibly embodied as instructions on a non-transitory computer-readable storage medium, the computer program product, when executed, implementing a method of planning a single frequency digital broadcasting network comprising at least one elevated transmission station and a plurality of low-height transmission stations, the method performed by a computer system comprising a processor and a memory encoded with program instructions that, when executed by the computer system, cause the computer system to perform the method comprising:

a) subdividing a geographic area of interest into a plurality of area elements;

b) simulating, using the processor, a distribution of an electromagnetic field originating from the transmission stations in every one of said area elements;

c) in at least one area element of the geographic area of interest, calculating, using the processor, received delays among signals received from the transmission stations based on the simulated electromagnetic field distribution;

d) sorting the transmission stations in a list;

e) based on said received delays and on the sorted list, calculating, using the processor, an initial vector of transmission delays;

f) subjecting the initial vector of transmission delays to a process of refinement consisting in repeatedly:

f1) perturbing the list of the transmission stations on the basis of a casual perturbation parameter;

f2) recalculating the transmission delays; and until the casual perturbation parameter has reached a predetermined minimum value, assigning the resulting transmission delays to each of the low-height transmission stations.

* * * * *